Jan. 25, 1938. J. HUMBLET 2,106,376
FIRE PROTECTING MEANS
Filed March 23, 1934

J. Humblet
INVENTOR

By: Marks & Clerk
Attys

Patented Jan. 25, 1938

2,106,376

UNITED STATES PATENT OFFICE 2,106,376

FIRE PROTECTING MEANS

Joseph Humblet, Brussels, Belgium

Application March 23, 1934, Serial No. 717,105
In Belgium and France March 27, 1933

1 Claim. (Cl. 169—39)

The invention concerns the fire protecting arrangements, for rooms, buildings and the like and has particular relation to the arrangements of this kind adapted to operate automatically.

It has already been proposed to provide the rooms and the like to be protected or containing goods or objects to be protected with a pipe arrangement connected to a water tank located at a top level, such tank being, in turn, supplied through an inexhaustible source.

The pipes are provided with spaced distributing nozzles, of which the opening is individually controlled by means of a fuse located in the neighbourhood of each distributing nozzle.

The main objection to such arrangements is the use of an extinguishing substance liable to injure the rooms or objects or goods to be protected and to freeze, so that, in most cases, the water arrangement is to be completed by a suitable air pressure arrangement, the air under pressure filling normally the distributing pipes.

It has already been proposed also to insure the protection by arranging within the rooms or the like or in communication therewith batteries of containers filled up with liquid carbonic acid which substance is far better adapted for fire extinguishing purposes and devoid from the inconveniences inherent to the use of water.

However, to insure an efficient extinguishing action, it is necessary to mix a large proportion of carbon dioxide to the air within the rooms or the like to be protected or containing goods or objects to be protected with the consequent necessity of storing a large quantity of such substance and of material expenses for every operation although the fire to be extinguished may be small in itself.

The invention aims to avoid the drawbacks of both types of the aforesaid protecting arrangements while retaining the special advantages of each of them.

Broadly the invention consists in providing in combination with the rooms or the like to be protected or containing goods or objects to be protected, a pipe arrangement provided with distributing nozzles located at suitable spaced points and connected to a battery of containers filled up with carbon dioxide under pressure or any other appropriate source of this substance, while the opening of each of the distributing nozzles is controlled by means of a fuse located in the neighbourhood thereof.

The invention also consists in arranging the battery of containers filled up with carbon dioxide under pressure, or the other source of this substance in such a way that the flow of carbon dioxide will be normally prevented while a device controlling the opening of the battery or source is arranged so as to operate upon operation of any one of the nozzle controlling devices.

Further the invention consists in arranging the control device associated with the battery or source of carbon dioxide so that the fuses controlling the opening of the distributing nozzles also control the flow of carbon dioxide from the battery or source.

In order that the invention may be clearly understood certain preferred constructions will now be described with more details and by way of example with reference to the accompanying drawing in which.

Figure 1:
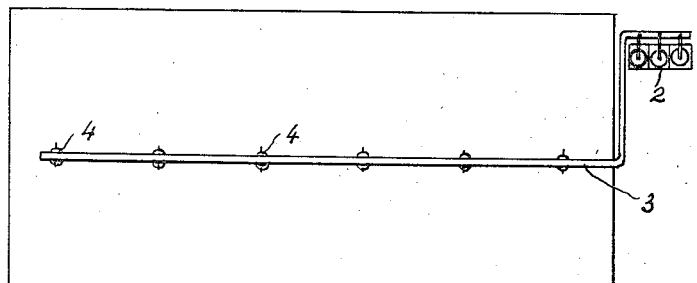
Fig. 1 shows diagrammatically a top plan view of a general arrangement in accordance with the invention.

With reference to Fig. 1, the reference 1 designates the room to be protected or containing goods or objects to be protected and 2 designates a battery of containers filled up with carbon dioxide under pressure, said battery being connected to a pipe arrangement illustrated by means of a single conduit 3.

At spaced points of such conduit or pipe 3, distributing nozzles 4 are provided, these nozzles being normally closed by means of valve like members 5 retained on the mouths 6 of the distributing nozzles 4 through suitable connection means including at least one fuse 7 together with a pressure member such as the pressure screw 8. This arrangement is best shown in the Figures 2 and 3.

Each of the fuses 7 comprises two metal strips 9 and 10 (Fig. 3) united together on a part of their common length by means of a fusible alloy $10^0$. One of the metal strips is extended at one end and this extended end is connected to or bears on the valve 5 closing the opening 6 while the other strip is extended at the other end and is connected to or bears on the pressure screw 8.

According to the invention, these fuses 7 are insulated by any suitable means such as the insulating washers $7^1$ illustrated.

Under such circumstances, when the fusible alloy melts or becomes soft by sufficient increase of the temperature, the metal strips 7 separate owing to the applied pressure, thus permitting the valve 5 to move away from its seat and the substance under pressure filling the pipe 3 or allowed to fill this pipe, to spread out within the surrounding medium.

To insure the opening of the battery 2 when one of the fuses 7 has been melted under an increased temperature, and in accordance with my invention, I provide an electric circuit 11 supplied through a suitable source 12, and including the fuses 7 and the coil 13 of an electro-magnet 14 arranged in series, the contact 15 of the electro-magnet 14 being normally attracted. I provide also a second electric circuit 16 including the contact 15 of the electro-magnet 14 as well as the coil of another electro-magnet 17 the core of which is connected to the actuating lever 19 of the device controlling the opening of the valves 20 mounted on the containers 2 filled with the carbon dioxide under pressure. The circuit 16 is supplied through a suitable source 21.

Figure 2:
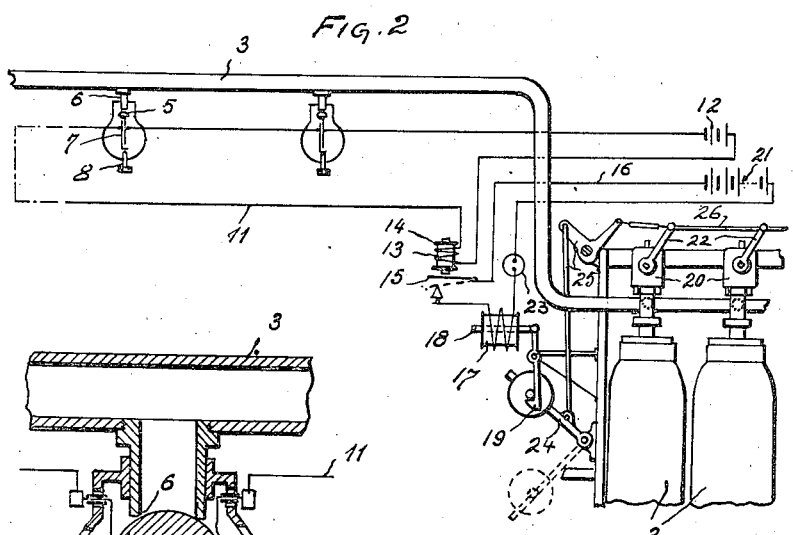
Fig. 2 is a partial elevational view of the arrangement.
Figure 3:
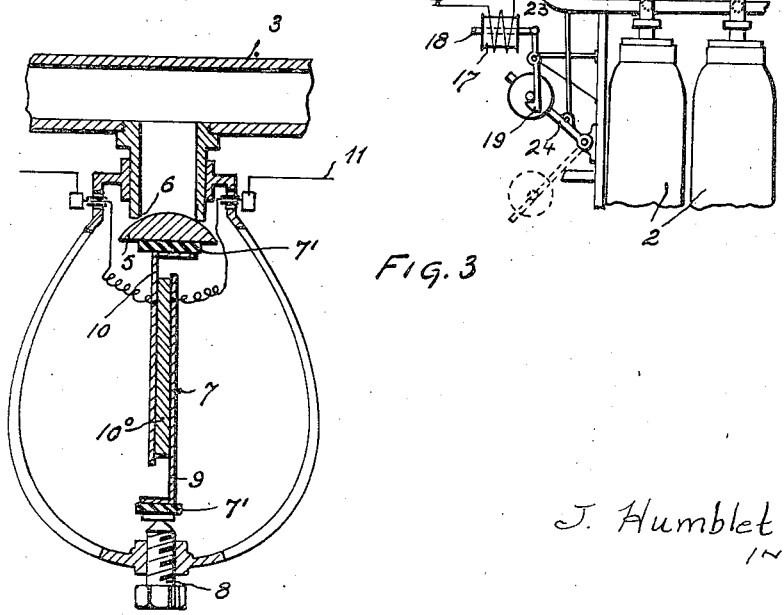
Fig. 3 shows in side elevation with parts in section, the arrangement of one of the fuses drawn at a larger scale.

As will be seen from Fig. 2, the actuating lever 19 is connected through suitable mechanical connections 25 including a counterweight 24, to a cross-bar 26 connecting together the operating levers 22 of the individual valves 20, the latter being preferably constructed as described in my patent application Serial Number 648,009 filed on December 19th, 1932, now matured into Patent No. 2,066,112, dated Dec. 29, 1936.

The operation of the aforesaid arangement is as follows. When a fuse 7 is melted by reason of a local increase of the temperature, the valve 5 opens the mouth of the corresponding distributing nozzle 4 while at the same time the electric circuit 11 is opened. The contact 15 of the electro-magnet 14 is released and reaches the position shown in dotted lines, thus closing the electric circuit 16. The coil of the electro-magnet 17 is energized and actuates the actuating lever 19 which in turn releases the counterweight 24 with consequent operation of the mechanical connections 25, cross bar 26 and operating levers 22 of the valves 20. These valves are thus opened permitting the carbon dioxide under pressure to pass to the pipe 3 and to spread out at the liberated distributing nozzle 4.

Assuming such distributing nozzle turned in the direction of the fire, the latter will be extinguished through the direct action of the carbon dioxide but in any case the flow of this substance from the nozzle will cause the surrounding medium to become saturated therewith with the resulting extinction of the fire.

The closure of the electric circuit 16 may be used with advantage to operate a warning signal 23, to warn the operator who, when the fire is extinguished, operates correctly the counterweight 24 to close the valves 20 and stop the flow of carbon dioxide.

It appears from the above that the invention enables large rooms and objects or goods contained therein to be effectively protected with a reduced consumption of carbon dioxide, the adequate saturation of the air within the rooms being only necessary at the fire location and its neighbourhood.

It is to be understood that the invention is not limited to the arrangements and apparatus more particularly described and illustrated but includes the modifications and equivalents thereof.

I claim:

A sprinkler head comprising a fuse including two conducting strips pasted together with a fusible alloy, one of the strips being extended at one end and bent substantially at right angles at that end and the other strip being extended at the other end and bent substantially at right angles at that end, the bent portions of the strips extending in opposite directions, and pressure means for maintaining said fuse under stress, the line of action of the said pressure means being in line with the central longitudinal axis of the fuse

JOSEPH HUMBLET.